United States Patent [19]

Larsen

[11] 4,402,658
[45] Sep. 6, 1983

[54] THERMOPLASTIC PIPE EXTRUSION DIE

[75] Inventor: Olaf E. Larsen, Dallas, Tex.

[73] Assignee: Phillips Petroleum Company, Bartlesville, Okla.

[21] Appl. No.: 304,234

[22] Filed: Sep. 21, 1981

[51] Int. Cl.³ .............................................. B29D 23/00
[52] U.S. Cl. .............................. 425/192 R; 264/209.4; 425/325; 425/380; 425/403; 425/466; 425/467
[58] Field of Search ........... 425/466, 190, 467, 192 R, 425/380, 325, 403; 264/209.1, 209.3, 209.4, 209.5, 209.7, 209.8

[56] References Cited

U.S. PATENT DOCUMENTS

| | | | |
|---|---|---|---|
| 3,184,792 | 5/1965 | Commisso | 425/467 |
| 3,239,881 | 3/1966 | Larsen | 264/209.1 |
| 3,309,436 | 3/1967 | Larsen | 264/176 R |
| 3,321,805 | 5/1967 | Given | 425/192 R |
| 3,387,073 | 6/1968 | Larsen | 264/209.7 |
| 3,471,899 | 10/1969 | Ronden | 425/466 |
| 3,690,806 | 9/1972 | Kovacs | 425/467 |
| 3,912,240 | 10/1975 | Smith | 425/380 |
| 3,932,102 | 1/1976 | Rosenbaum | 425/466 |
| 4,069,001 | 1/1978 | Carrow | 425/467 |
| 4,120,628 | 10/1978 | Simos | 425/466 |
| 4,314,958 | 2/1982 | Macleod et al. | 264/209.4 |

FOREIGN PATENT DOCUMENTS

2610972 9/1977 Fed. Rep. of Germany ... 264/209.4

Primary Examiner—Jeffery R. Thurlow

[57] ABSTRACT

A die assembly for the extrusion of thermoplastic pipe from a plastic exhibiting an appreciable amount of memory and thus having an elongated heated portion defined by an elongated outer bushing ring with an inside diameter substantially equal to the nominal outside diameter of the pipe to be produced and an inner mandrel ring having an outside diameter smaller than the inside diameter of the bushing ring and disposed within the bushing ring to form an annular extrusion channel, the essentially straight portion of the extrusion channel defining the land length of the die and the width of the extrusion channel defining the die opening of the die, the improvement comprising a mandrel formed in two sections, including a longer upstream section, fixedly mounted in the die and having a fixed mandrel outside diameter and a downstream mandrel section removably mounted in the die as an extension of the upstream section and replaceable by downstream mandrel sections of equal length but different mandrel outside diameters. The improved die assembly is capable of producing a given diameter pipe having a plurality of different SDR Ratings which closely approximates a predetermined land length to die opening ratio for each of the different SDR ratings, thereby eliminating the necessity of providing a complete new die assembly for each different SDR rating desired.

15 Claims, 5 Drawing Figures

THERMOPLASTIC PIPE EXTRUSION DIE

BACKGROUND OF THE INVENTION

The present invention relates to die assemblies for the extrusion of thermoplastic pipe. More specifically, the present invention relates to die assemblies for the extrusion of thermoplastic pipe from plastics having an appreciable amount of memory.

It is common to manufacture structures, from samll tubing with a small diameter up to pipe with diameters as large as 36 inches, from thermoplastics. Thermoplastic pipe has found uses in municipal water and sewer systems, for the transport of natural gas and the like, for the transport of fluids of all types in chemical plants and refineries, etc., depending, of course, upon the resistance of the plastic to deterioration by the fluid transported as well as the environment around the outside of the pipe. For uses such as water and sewer lines, natural gas lines and the like, such pipe must, of course, have certain minimal pressure ratings. Accordingly, the American Society for Testing Materials (ASTM), as well as other standardizing organizations, have set minimal standards for plastic pipe. The pressure rating of a plastic pipe is related to what is termed the "Standard Dimension Ratio" (SDR) of the pipe, which may range from SDR 11 to as high as SDR 32.5 and cover pressure ranges from about 160 psi to 50 psi, respectively. The Standard Dimension Ratio (SDR) is equal to the nominal outside diameter (OD) of the pipe divided by the minimum wall thickness of the pipe. Thus, the following formula defines SDR:

$$SDR = D_p/t \qquad (1)$$

where:
  $D_p$ = Nominal OD of Pipe, inches, and
  $t$ = Minimum Wall Thickness, inches.

Accordingly, for each SDR and thus each pressure rating, each size of pipe will have a different specified minimum wall thickness and close tolerances within which this thickness shall be kept. The outside diameter, which is the actual outside diameter, is referred to as the "nominal outside diameter" as opposed to the nominal size, which is the rounded off numerical diameter for pipe sizes up through a nominal size 12-inch pipe. The outside diameter is larger than the nominal size for nominal sizes through 12-inches, which has a nominal outside diameter of 12.750. However, above 12 inches the nominal size and the nominal outside diameter are equal. Since, as indicated, the pressure rating of a specific pipe is determined by the SDR, the following formula for obtaining the pressure rating of sewer pipe at 73.4° F. can be utilized:

$$P = 2S/SDR - 1 \qquad (2)$$

where:
  P = Pressure Rating, psi, at 73.4° F. and
  S = Hydrostatic Design Stress, 800 psi.

In addition to the pressure rating and standards set forth to accomplish this end, specific plastics require different dies in the formation of the pipe. For example, a plastic, such as polyethylene, which has an appreciable amount of memory, requires a die having an elongated heated section, which actually is the main pipe forming section of the die. This section of the die is also referred to as the "land" and its length as the "land length", and is an elongated, substantially straight annular space formed between an elongated outside bushing ring and an elongated inside mandrel. In order to produce a given size pipe meeting the specifications for a given SDR, experience with the use of a given plastic teaches one that a die should have a land length to die opening ratio of approximately a predetermined value, where the die opening is the thickness of the annular space between the outer bushing and the inner mandrel. For example, for a particular polyethylene, it has been found that a land length to die opening ratio of approximately 35:1 must be met for efficient extrusion and the production of pipe meeting standard specifications.

It is also obvious that, in the extrusion of large diameter pipe, the cost as well as the handling of heavy metal dies, particularly those having long land lengths, becomes a serious problem. This problem is aggravated by the fact that a given diameter pipe, having a given SDR value, requires a specific die opening and thus each die can be used only for making a single diameter pipe having a single SDR. As indicated, for large diameter pipes, this becomes a real problem because of the cost of such dies. As a result, such dies, for producing large diameter pipes, are often shipped from one manufacturing plant to another of the same owner, rather than to purchase more than one die for each size pipe having a particular SDR rating. Another cost saving procedure, followed by some pipe manufacturers, to overcome this problem is to have a die built for a single pipe diameter and a plurality of inside bushings which can be substituted for one another each time a different die opening is desired to produce pipe of that particular outside diameter but having different SDR ratings. As previously indicated, the internal mandrel is a heavy metal elongated ring. Removal and replacement of the inner mandrel is not a serious problem with small diameter pipes below about 6 inches, since the mandrel will have an outside diameter less than 6 inches and a length less than about 27 inches. However, for larger extrusion dies, such as those for the production of 18-inch and 24-inch pipe, a serious problem exists since the mandrel will be nearly 18 or 24 inches in diameter and as long as 98 inches and up.

In practice of the previously mentioned procedure of removing and replacing the entire mandrel, for example, utilizing a set of three mandrels for making 24-inch pipe having SDR ratings of 32.5, 21 and 11, respectively, the die is designed for a mandrel for the thinnest pipe (SDR 32.5) and replacement mandrels of the same length are supplied for the heavier walls required for SDR 21 and SDR 11 pipes. The result of this design is that a 24-inch die designed for extrusion of a plastic requiring a 35:1 land length to die opening ratio (for an SDR 32.5) will result in the modified die for producing SDR 21 pipe having an effective land length to die opening ratio of 22:1 and the modified die for making SDR 11 pipe having an effective land length to die opening ratio of 12:1. Obviously, the large variations from the required land length to die opening ratio of 35:1 can create very serious problems, both in the formation of the pipe by the die, as well as the production of pipe meeting the various standards and specifications.

It is, therefore, an object of the present invention to provide an improved die assembly for the extrusion of thermoplastic pipe. Another object is to provide an improved die assembly for the extrusion of thermoplastic pipe, wherein a single basic die can be converted for the production of a specific diameter pipe having different SDR ratings. Another and further object of the present invention is to provide an improved die assembly for the extrusion of thermoplastic pipe from a plastic exhibiting an appreciable amount of memory. A still further object of the present invention is to provide an improved die assembly for the extrusion of thermoplastic pipe which is adapted to produce a given diameter pipe having a plurality of different SDR ratings, which die closely approximates a predetermined land length to die opening ratio for each of the different SDR ratings. Yet another object of the present invention is to provide an improved die assembly for the extrusion of thermoplastic pipe which is capable of being converted to the production of pipe of a given diameter but having different SDR ratings by replacement of a single relatively small element with a minimum of part removal and replacement. Another further object of the present invention is to provide such an improved die assembly which can be converted for use with plastics having different degrees of shrinkage.

SUMMARY OF THE INVENTION

A die assembly for the extrusion of thermoplastic pipe from a plastic exhibiting an appreciable amount of memory, and thus having an elongated, heated portion defined by an elongated outer bushing ring having an inside diameter substantially equal to the nominal outside diameter of the pipe to be produced and an inner mandrel ring having an outside diameter smaller than the inside diameter of the bushing ring and disposed within the bushing ring to form an annular extrusion channel between the bushing ring and the mandrel ring, the essentially straight portion of the extrusion channel defining the land length of the die and the width of the extrusion channel defining the die opening of the die, is improved by forming the mandrel in two sections, including a longer, upstream mandrel section fixedly mounted in the die and having a fixed mandrel outside diameter and downstream mandrel section removably mounted in the die as an extension of the upstream mandrel section and replaceable by downstream mandrel sections of equal length, but different mandrel outside diameters. The preferred assembly includes at least three mandrel extensions of different outside diameters adapted to produce an equal number of different pipes having a corresponding number of different standard dimension ratios, the land length of the die being dependent upon the standard dimension ratio of an intermediate one of the pipes to be produced and a predetermined land length to die opening ratio for the plastic from which the pipe is to be produced. The die is further improved by providing a plurality of replaceable cooled portions comprising elongated sizing rings replaceably mountable on the die downstream of the heated portion of the die, each sizing ring being of equal length but a different inside diameter, depending upon the percent shrinkage of the plastic from which the pipe is to be formed.

DESCRIPTION OF THE PREFERRED EMBODIMENTS

The preferred embodiments of the present invention and the use and advantages of the present invention can best be understood by reference to the drawings.

Figure 1:
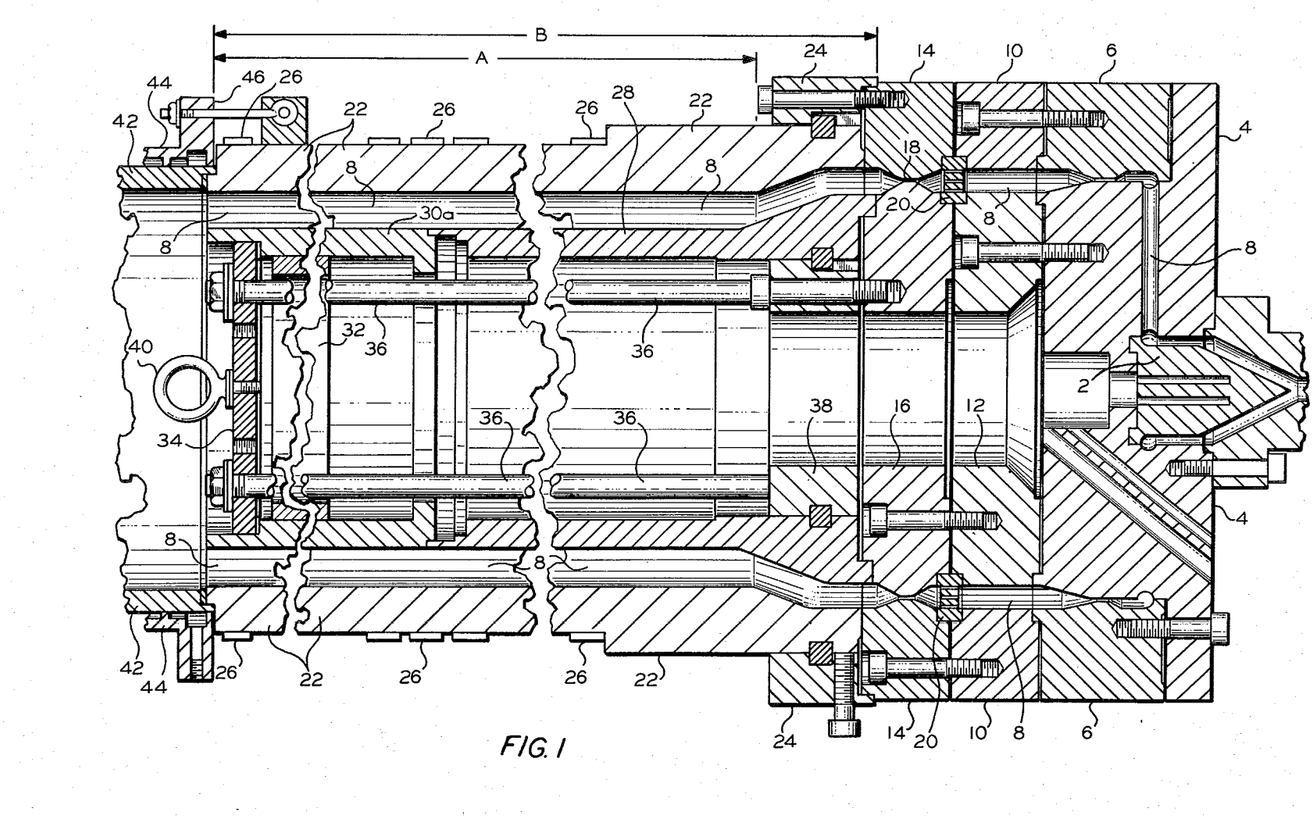
FIG. 1 of the drawings is a sideview, partially in section, of an overall pipe forming die showing a conventional upstream portion of the die and a partial section of the downstream portion of the die, including the improvement of the present invention.
Figure 2:
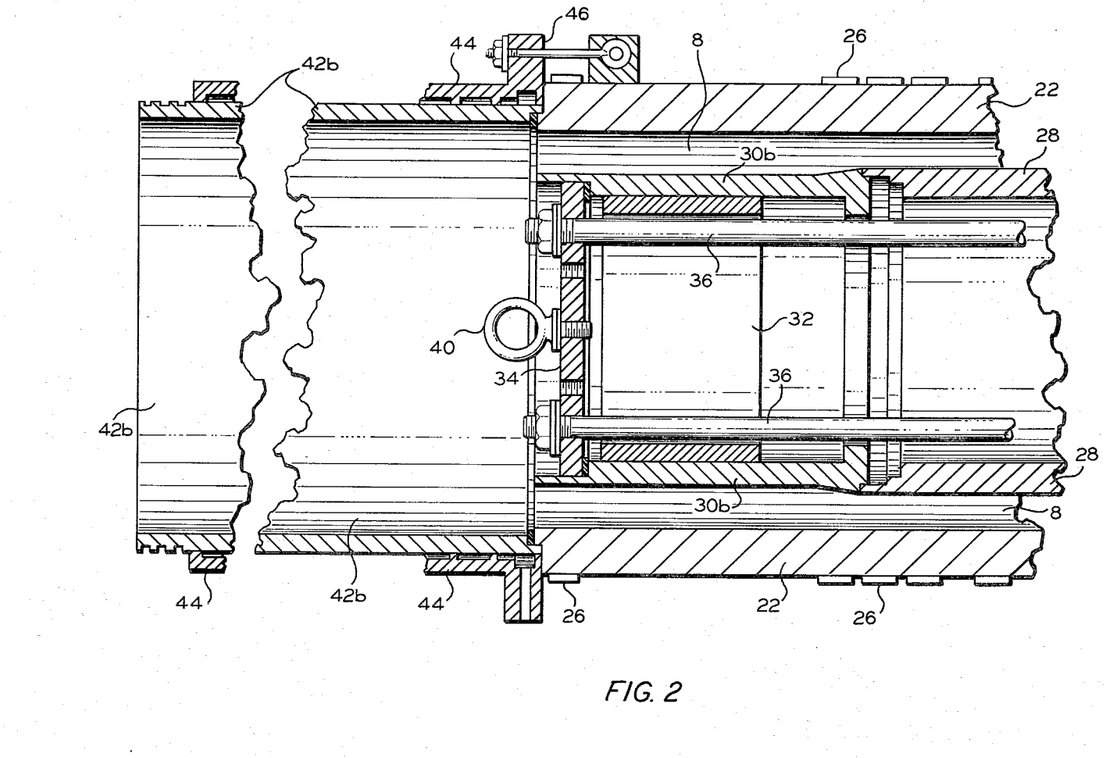
FIG. 2 is a side view, partially in cross section, of the downstream portion of a die assembly in accordance with the present invention, including one replaceable mandrel section and one replaceable sizing ring.
Figure 3:
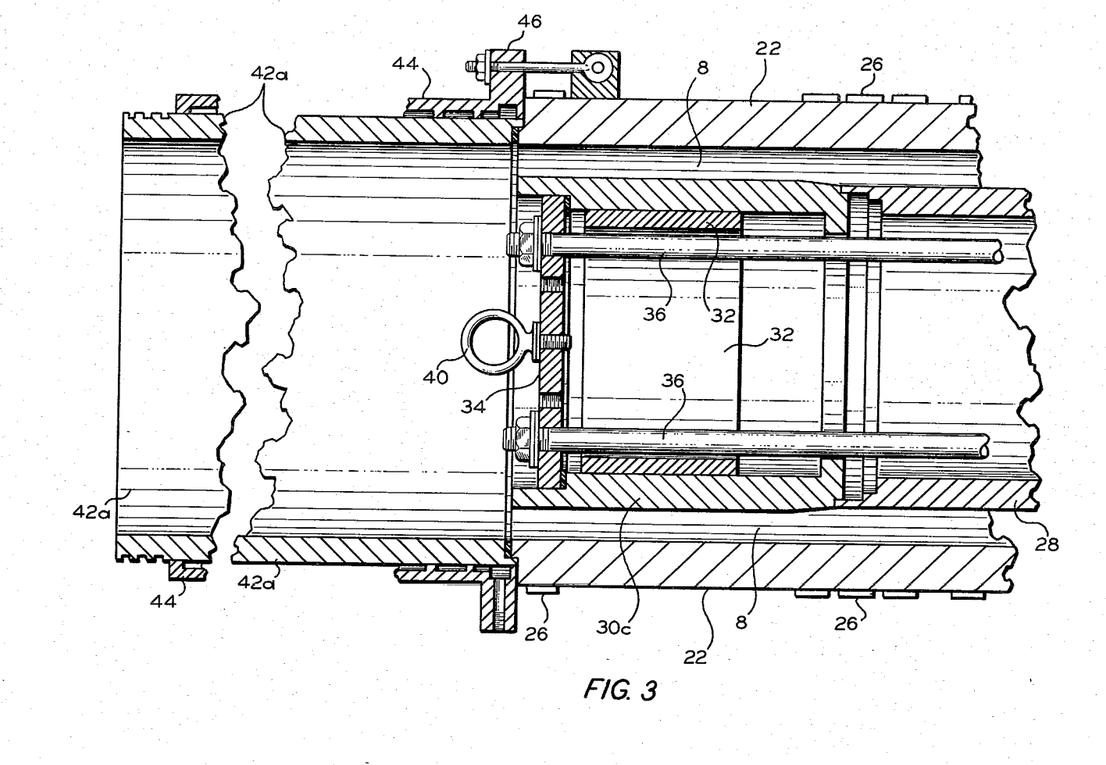
FIG. 3 is a side view, partially in cross section, of the downstream portion of a die assembly in accordance with the present invention showing another mandrel section and another sizing ring.
Figure 4:
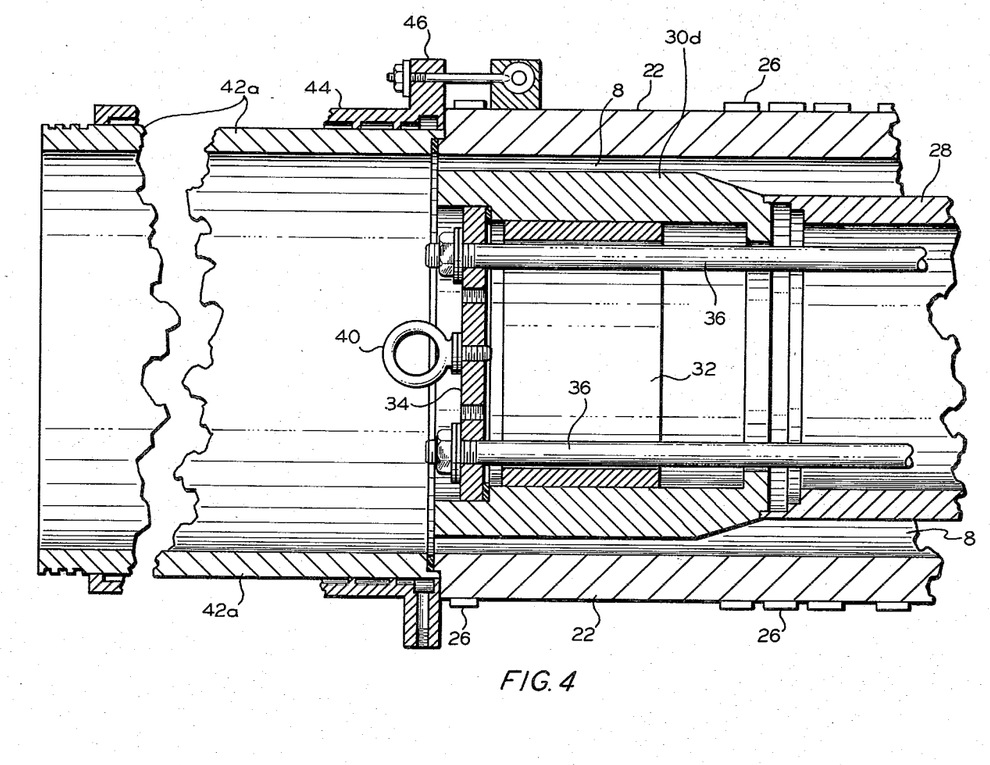
FIG. 4 is a side view, partially in section, of the downstream portion of the die assembly showing yet another mandrel extension and the same sizing ring as FIG. 3.
Figure 5:
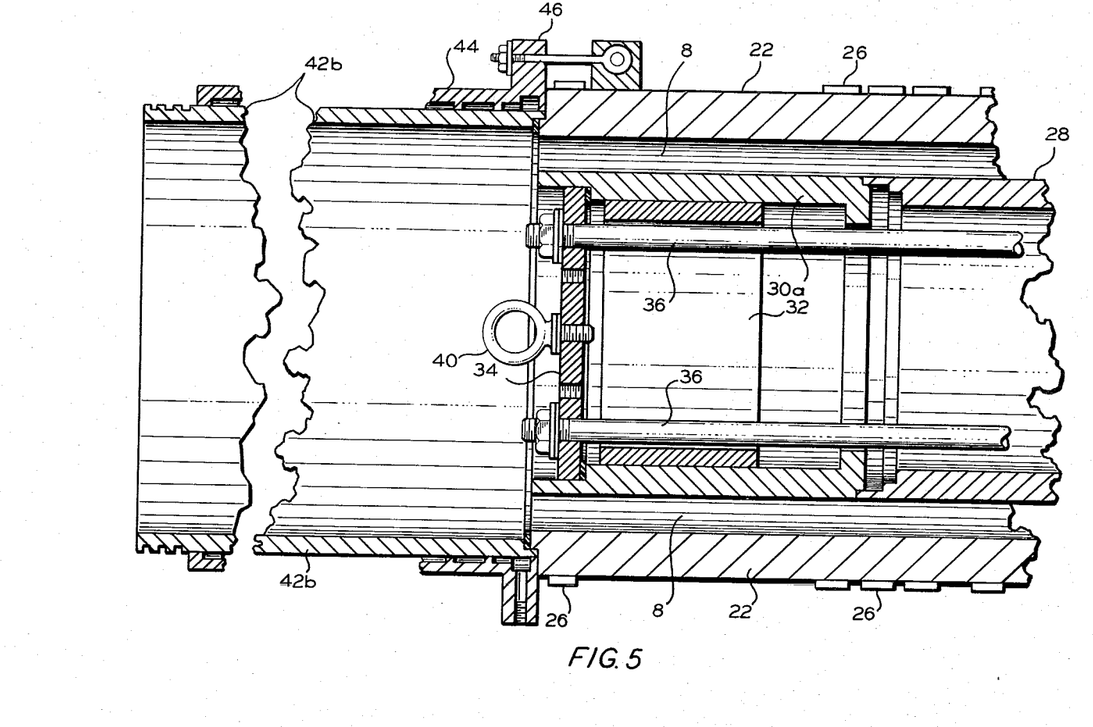
FIG. 5 is a side view, partially in section, of the downstream portion of the die assembly showing still another mandrel extension and the same sizing ring as shown in FIG. 2.

In accordance with the drawings, FIG. 1 shows a basic extrusion die, including a conventional injection or upstream end. In this Figure, and FIG. 5, a mandrel extension ring having the same outside diameter as the upstream mandrel section and the same inside diameter bushing is shown, as well as one size sizing sleeve. FIGS. 2, 3 and 4 illustrate variations of the mandrel extension and sizing sleeves of a different diameter, all in accordance with the present invention. The prow 2 is mounted in mandrel support 4 and, together with the outer ring 6 forms injection conduits 8. Downstream and attached to outer ring 6 is outer plenum ring 10. Mounted within outer plenum ring 10 is inner plenum ring 12, which together with outer plenum ring 10 forms an extension of injection conduits 8. Downstream from outer plenum ring 10 is outer restrictor ring 14 and mounted within and cooperating with outer restrictor ring 14 is inner restrictor ring 16. Outer restrictor ring 14 and inner restrictor ring 16 together form a necked down opening or choke 18 in the injection conduits 8. Inner and outer plenum rings 10 and 12 and inner and outer restrictor rings 14 and 16 hold therebetween breaker plate or screen 20 through which the resin flows. Downstream from outer restrictor ring 14 is bushing 22. Bushing 22 is held in place by bushing retaining ring 24, which in turn is attached to outer restrictor ring 14. Bushing 22 has substantially its entire length heated by means of band heater 26 or the like and together with the hereinafter mentioned mandrel and mandrel extension, forms an annular extension of injection conduits 8. Mounted within bushing 22 is upstream mandrel section 28 and downstream from mandrel section 28 is downstream mandrel extension or section 30a. In addition, the bushing and mandrels make up the heated section of the die and define the land length of the die. Specifically, as shown, the distance A in FIG. 1 represents the land length in a die such as that illustrated. In this instance, the land length is from the downstream end of the mandrel extension to the beginning of the flared section of channel 8. In other dies where the flared section of channel 8 is not as severe and an essentially straight channel is formed from the upstream end of the upstream mandrel section to the downstream end of the downstream mandrel extension, the land length would be as shown by the distance B of FIG. 1. Mandrel extension 30a is provided with an internal tip heater 32. As indicated, mandrel extension 30a is readily replaceable and, accordingly, is held in place by closure plate or retaining plate 34 and retaining bolts 36 which, in turn, pass through mandrel retaining plate 34 and into mandrel retaining ring 38. For ease of removal and replacement of mandrel extension 30a, eyebolt 40 is mounted in closure plate 34. Consequently, all that is necessary for the removal and the replacement of mandrel extension 30a is the removal of the nuts holding retaining plate 34 on bolts 36, the removal of the retaining plate and mandrel extension 30a, the replacement of mandrel extension 30a and the remounting of retaining plate 34 and the nuts on retaining bolts 36. Extending downstream from bushing 22 is sizing sleeve 42a. Sizing sleeve 42a is cooled by cooling jacket 44 through which water is circulated in order to cool the pipe being extruded and solidify the same. As indicated, sizing sleeve 42a is also replaceable and, consequently, is held in place through a flange about cooling jacket 44 and bolts running through a flange around bushing 22. FIG. 2 of the drawings illustrates a different mandrel extension 30b and a different sizing sleeve 42b. FIG. 3 shows still another mandrel extension 30c, together with sizing sleeve 42a. FIG. 4 shows a fourth mandrel extension 30d, together with sizing sleeve 42a. FIG. 5 includes mandrel extension 30a together with sizing sleeve 42b.

In the use of a die of the character referred to herein, an extrusion assembly is coupled to the mandrel support and a liquidified plastic is forced under pressure into the conduits 8, through breaker plate or screen 20, through the necked down portion 18 of conduits 8 and thence into the downstream annular portion of channel 8. The annular portion of channel 8, as previously indicated, is the basic pipe forming portion of the die and in order to maintain the plastic in a liquid state, this section is appropriately a heated section. However, by the time the formed pipe reaches the downstream end of annular channel 8, it has solidified but is pliant. Cooling is completed as the formed pipe passes inside sizing sleeve 42, which is provided with an appropriate, cooling jacket 44. The completely solidified pipe as its leaves sizing ring 42, is drawn from the die at a speed greater than the speed of travel of the plastic through forming channel 8 and sizing sleeve 42. Because of this drawing or stretching of the pipe, which will occur while the pipe is still pliable, the forming channel 8 has a width or die opening larger than the ultimate minimum thickness of the finished pipe. The draw ratio to be utilized is determined by experience and depends upon the plastic to be utilized in the formation of the pipe, the size of the pipe to be formed and the pull or draw which is necessary to reduce the thickness of the pipe from the width of the channel 8 or die opening to the ultimate thickness of the finished pipe. Usually the draw ratio is about 1.5 for pipes less than about six inches in diameter and ranges down to about 1.25 for larger diameter pipe.

As previously indicated in the introductory portion hereof, where one wishes to utilize a die designed for the production of a particular size pipe, to produce pipe of that diameter but of different standard dimension ratios and thus different pressure ratings, the conventional practice is to replace the entire mandrel with other mandrels of different outside diameters so as to provide a different extrusion channel width or die opening for each pipe having a different SDR rating to be produced. Because of the size and weight of the entire mandrel, particularly in large diameter pipe, and the complexities of changing the entire mandrel, that is not the most practical solution. It has been found in accordance with the present invention that the same results can be accomplished by forming the mandrel in two sections, which include an upstream fixedly mounted portion, having a fixed die opening and a downstream extension portion, which constitutes less than half the length of the total mandrel and preferably between about one-third and one-half of the downstream end of the mandrel, which is readily removable and replaceable by mandrel extensions of a different outside diameter for each pipe having a different SDR rating to be produced.

Normally, in accordance with conventional practice, in order to produce pipe of a given size but different SDR values when the entire mandrel is replaced, it will be necessary to utilize a different length mandrel for each SDR rating in order to provide a die having a specific predetermined land length to die opening ratio for a particular plastic to be used. This, of course, is completely impractical since it would also require removal and replacement of the outer bushing and modification or changing of the heating means for the land of the die, as well as replacement or modification of the sizing sleeve and cooling means. Consequently, it is also conventional practice, as previously indicated in the introductory portion, to design the die to produce the thinnest pipe (largest SDR) and having a land length determined by the specific land length to die opening ratio to be utilized for the particular plastic. The other mandrels are then made the same length but of different outside diameter. Consequently, the effective land length to die opening ratios for such other mandrels (of smaller diameter) will differ substantially from the specific predetermined land length to die opening ratio required for the plastic to be utilized. However, in accordance with the present invention, it has been found that the land length to die opening ratio of the die, for the plastic to be utilized, can be more closely approximated if the plurality of removable and replaceable mandrel extensions, in accordance with the present invention, are made the same length to thus have the same land length, but the die is designed so that the basic land length will be for an intermediate thickness pipe (intermediate SDR) as determined for the specific predetermined land length to die opening ratio required for the particular plastic to be utilized.

Also, it has been found in accordance with the present invention that improved results are obtained if the sizing sleeve, utilized in the cooling of the extruded pipe, is also made readily removable and replaceable by sizing sleeves having different internal diameters. This makes it possible to compensate for differing percentages of shrinkage when the finished pipe is finally completely solidified.

A die assembly having a plurality of readily removable and replaceable mandrel extensions in accordance with the present invention will have the following structural relationships. The land length of the die is approximately:

$$LL = DO \times LL/DO \qquad (3)$$

where:
  LL = Land Length, inches,
  LL/DO = Land Length to Die Opening ratio which is a fixed value for the plastic to be used, and,
  DO = Die Opening, inches, distance between the bushing ring and the downstream mandrel extension and is approximately:

$$DO = DR \times t \qquad (4)$$

where:

DR = Draw Ratio, preselected to produce a pipe having a specific wall thickness from a die having a specific die opening utilizing a particular plastic, and t = Minimum Wall Thickness, inches, for a pipe having a standard dimension ratio (SDR) intermediate the SDR of the pipes having the largest and the smallest minimum wall thicknesses to be produced by the die.

The minimum wall thickness may be obtained from a table of standards, such as that contained in ASTM D2513 or by calculation from the relationship:

$$SDR = Dp/t \qquad (5)$$

where:

Dp is the nominal outside diameter, inches, of the pipe to be produced by the die, which can be obtained from the ASTM standard tables or other standards, and t = Minimum Wall Thickness, inches, The SDR utilized to establish the land length of the die is preferably midway between the range of SDRs for which the particular diameter pipe is to be produced. This intermediate or midpoint SDR need not be a standard SDR, but may be an arbitrary number, which is midway between the smallest and largest SDR values, for example if the SDR range of pipe to be manufactured in the die is from 41 to 11, the selected midpoint SDR would be 26 and the wall thickness and land length can be calculated from the formula for determining SDR and land length, as set forth above.

As previously indicated, the land length of the die is the essentially straight, annular pipe forming portion or heated portion of the die between the downstream end of the mandrel and the beginning of the upstream flared portion of the mandrel, designated as A in FIG. 1, or a distance from the downstream end of the mandrel to the upstream end of the mandrel and/or the outside bushing and designated as B in the drawing. The die assembly illustrated in the drawings of the present application is one designed to produce pipe having a nominal outside diameter of 18 inches and because of the sharp flare on the upstream end of the mandrel and outside bushing, the land length is the distance A. However, in a die of the same character, designed for the production of pipe having a 24-inch nominal outside diameter, the flare at the upstream end is hardly perceptable so that the pipe forming channel is essentially straight for the entire length of the mandrel. Accordingly, the land length is essentially the total length of the mandrel and/or the outside bushing as designated by B in FIG. 1 of the drawings. Also, as previously indicated, the mandrel is formed in two sections, the upstream section being fixedly mounted in the die while the downstream section, comprising less than one-half of the total die length and preferably between one-third and one-half of the total length of the mandrel, is removable and readily replaceable by a plurality of mandrel extensions having the same length but having different outside diameters.

Accordingly, the outside diameters of the plurality of mandrel extensions to be utilized to produce an equal number of different pipes having the same nominal outside diameter but different SDR ratings are determined by the relationship (4), set forth above where DO is the die opening or width of the annular channel, in inches, between the outside bushing and the mandrel extension in question, DR is the previously mentioned draw ratio to be utilized and is the same predetermined value for all pipes to be produced in the die and t is the minimum wall thickness, in inches, for each pipe of a different SDR rating to be produced by the die.

The outside diameter of each downstream mandrel section or mandrel extension can then be determined by the relationship:

$$MOD = BID - 2DO \qquad (6)$$

where:

MOD = Mandrel Extension Outside Diameter, inches,

BID = Bushing Inside Diameter, inches, and

DO = Die Opening, inches, as determined by the relationship (4) set forth above for each particular SDR rating of pipe to be produced.

By way of specific example, the die assembly illustrated in the drawings is adapted to produce pipe having an 18-inch nominal outside diameter from a plastic which requires a land length to die opening ratio for the die of approximately 35/1 and which pipe would have SDR ratings for a range of 41 to 11. In this particular instance, the land length is, as previously indicated, A on FIG. 1 of the drawings, which length was established for a pipe having an SDR rating of 26, i.e., the midpoint between 41 and 11. In this particular instance, the land length was established at 28.403 inches. This, of course, consisted of the downstream straight portion of the upstream mandrel section, which is approximately 14.043 inches in length, and the removable and replaceable downstream portions of the mandrel or the mandrel extensions, which in this case were selected to be 14.360, which is less than half of a total mandrel length of 33.465 inches. The bushing inside diameter was, of course, eighteen inches or the same as the nominal outside diameter of the pipe to be produced. The die was designed to have a land length to die opening ratio of 35 to 1 at an SDR rating of 26, which land length to die opening ratio was a predetermined value based upon the plastic to be utilized in the die assembly. Also, based upon the plastic to be utilized and the force necessary to produce the specific thickness of pipe required by the SDR standards from the pliable pipe of greater thickness as established by the die opening, a predetermined draw ratio of 1.29 was utilized. Accordingly, Table 1 below shows dimensional relationships discussed above for the production of 18-inch pipe having SDR ratings of 32.5, 15.5 and 13.5, respectively, which can be produced by utilizing the mandrel extensions illustrated in FIG. 4, FIG. 3 and FIG. 1 or 5 of the drawings of the present application. The mandrel extension shown in FIG. 2 of the drawings would be adapted to produce even thicker pipe which, for example, could have an SDR rating of 11.

TABLE I

| | 26 | 32.5 | 15.5 | 13.5 |
|---|---|---|---|---|
| Standard Dimension Ratio (SDR) | | | | |
| Nominal OD of Pipe (Dp), inches, from Standard Tables. Also Bushing ID (BID), inches | | 18.000 | 18.000 | 18.000 |

TABLE I-continued

| | | | | |
|---|---|---|---|---|
| Minimum Wall Thickness of Pipe (t), inches. | | | | |
| t = Dp/SDR or Standard Tables | | 0.554 | 1.161 | 1.333 |
| Draw Ratio (DR). | | | | |
| DR = DO/t | | 1.29 | 1.29 | 1.29 |
| Die Opening (DO), inches | | | | |
| DO = DR × t or DO = BID − MOD/2 | | 0.714 | 1.500 | 1.716 |
| Extension Mandrel OD (MOD), inches. | | | | |
| MOD = BID − 2DO | | 16.572 | 15.000 | 14.568 |
| Land Length/Die Opening (LL/DO) | 35/1 | | | |
| Land Length (LL), Inches, for Intermediate SDR | | | | |
| (26);LL = DO × LL/DO | 28.403 | 28.403 | 28.403 | 28.403 |
| Effective Land Length/Die Opening (LL/DO) | | | | |
| LL/DO = LL/DO | | 40/1 | 19/1 | 17/1 |
| Pressure Rating of Pipe (P), psi | | | | |
| P = 2S/SDR − 1 @ 73.4° F. | | | | |
| Where: S = Hydrostatic Design Stress, 800 psi. | | | | |
| or Standard Tables | | 50 | 110 | 160 |

As set forth in the table above, this particular assembly is adapted to produce 18-inch pipe having SDR ratings of 32.5, 15.5 and 13.5, respectively. The effective land length to die opening ratio, as set forth in the table, are calculated for the specific SDR ratings and are thus the effective land length to die opening ratio, rather than the predetermined 35 to 1 ratio utilized in establishing the land length for the die. However, it is to be observed that these effective land length to die opening ratios are close to 35 to 1 for all the three variations specifically referred to in the table. If, on the other hand, the die were designed to have a land length to die opening ratio of 35 to 1 at an SDR rating of 41 (the thinnest pipe to be produced), as is conventional practice, the effective land length to die opening ratios of such a die would vary much more widely from the desired 35 to 1 ratio. Specifically, in this instance, the land length would be 19.810 inches but the effective land length to die opening ratios to produce pipe having SDR ratings of 32.5, 15.5 and 13.5 would be 28/1, 13/1 and 11/1, respectively.

In another example, the die was designed to produce pipe having a nominal outside diameter of 24 inches and having three different SDR ratings, specifically 32.5, 21 and 13.5. As in the previous example, the SDR range for which the die assembly is constructed was from 41 to 11. Accordingly, the land length was established for an SDR rating of 26, as in the previous example, at a land length to die opening ratio of 35 to 1 and utilizing a draw ratio of 1.29, as in the previous example. The following table sets forth the relationships mentioned in the previous example.

TABLE II

| | | | | |
|---|---|---|---|---|
| Standard Dimension Ratio (SDR) | 26 | 32.5 | 21 | 13.5 |
| Nominal OD of Pipe (Dp), inches or | | | | |
| Bushing ID (BID), inches. | | 24.000 | 24.000 | 24.000 |
| Minimum Wall Thickness of Pipe (t), inches. | | 0.738 | 1.143 | 1.778 |
| Draw Ratio (DR) | | 1.29 | 1.29 | 1.29 |
| Die Opening (DO), inches. | | 0.951 | 1.455 | 2.248 |
| Extension Mandrel OD (MOD), inches. | | 22.098 | 22.091 | 19.505 |
| Land Length/Die Opening (LL/DO) | 35/1 | | | |
| Land Length (LL), inches, for Intermediate | | | | |
| SDR (26). | 44.148 | 44.148 | 44.148 | 44.148 |
| Effective Land Length/Die Opening (LL/DO) | | 46/1 | 31/1 | 20/1 |
| Pressure Rating of Pipe (P), psi. | | 50 | 80 | 130 |

It is to be observed in this instance that the effective land length to die opening ratio well brackets the desired 35 to 1 ratio. However, if the die were designed in accordance with the prior art, i.e., to produce the thinnest pipe (SDR 41) and had a land length to die opening ratio at 35 to 1 (at this SDR rating, the land length would be 26.425 inches. However, the effective land length to die opening ratios would be 28/1, 18/1 and 12/1 in order to produce pipe having SDR ratings of 32.5, 21 and 13.5, respectively. These, of course, are radical departures from the desired 35 to 1 ratio.

While specific structures and specific examples have been set forth herein, it is to be understood that variations equivalents and modifications thereof will be apparent to one skilled in the art and the invention is to be limited only in accordance with the claims.

What is claimed is:

1. In a die assembly for the extrusion of thermoplastic pipe from a plastic exhibiting an appreciable amount of memory and thus having an elongated, heated portion defined by an elongated outer bushing ring having an inside diameter approximately equal to the nominal outside diameter of the pipe to be produced and an inner mandrel ring having a length substantially equal to the length of said bushing ring and an outside diameter smaller than said inside diameter of said bushing ring to form an annular extrusion channel therebetween; the improvement, comprising:

(a) said bushing ring being a single bushing ring having an essentially constant inside diameter throughout substantially its entire length constituting the downstream portion thereof; and (b) said mandrel ring being formed of two sections comprising (1) a longer upstream section fixedly mounted in said die and having an essentially constant outside diameter throughout substantially its entire length constituting the downstream portion thereof, which is opposite the constant inside diameter portion of said bushing ring and (2) at least one replacable, shorter, downstream section removably mounted in said die as an extension of said upstream mandrel section having an essentially constant outside diameter throughout substantially its entire length constituting the downstream portion thereof and differing from said outside diameter of said upstream mandrel section;

(c) the length of the constant inside diameter portion of said bushing ring and thus the constant outside diameter portion of said upstream section of said mandrel ring plus the entire length of said downstream section of said mandrel ring defining the land length of said die; and (d) the difference between said inside diameter of said bushing ring and said outside diameter of said downstream portion of said mandrel ring defining the die opening of the die.

2. In a die assembly for the extrusion of thermoplastic pipe from a plastic exhibiting an appreciable amount of memory and thus having an elongated, heated portion defined by an elongated outer bushing ring having an inside diameter approximately equal to the nominal outside diameter of the pipe to be produced and an inner mandrel ring having a length substantially equal to the length of said bushing ring and an outside diameter smaller than said inside diameter of said bushing ring to form an annular extrusion channel therebetween; the improvement, comprising:

(a) said bushing ring being a single bushing ring having an essentially constant inside diameter throughout substantially its entire length constituting the downstream portion thereof; and (b) said mandrel ring being formed of two sections comprising (1) a longer, upstream section fixedly mounted in said die and having an essentially constant outside diameter throughout substantially its entire length constituting the downstream portion thereof which is opposite the constant inside diameter portion of said bushing ring and (2) at least three alternately replaceable, shorter downstream sections removably mounted in said die as extensions of said upstream mandrel section, of equal length and having essentially constant outside diameters throughout substantially their entire length constituting the downstream portions thereof and including (A) a single first section having an outside diameter substantially equal to said outside diameter of said upstream section of said mandrel ring, (B) at least one second section having an outside diameter greater than said outside diameter of said upstream section of said mandrel ring and (C) a least one third section having an outside diameter less than said outside diameter of said upstream section;

(c) the constant inside diameter portion of said bushing ring and thus the constant outside diameter portion of said upstream section of said mandrel ring plus the entire length of said downstream section of said mandrel ring defining the land length of said die; and (d) the difference between said inside diameter of said bushing ring and said outside diameters of said downstream portions of said downstream sections of said mandrel ring, defining a plurality of alternative die openings of said die equal in number to the number of said downstream sections of said mandrel ring.

3. A die assembly in accordance with claim 1 or 2 wherein the downstream mandrel section has a shoulder means extending inwardly from the interior of said downstream mandrel section and said shoulder means is adapted to removably mount said downstream mandrel section in said die.

4. A die assembly in accordance with claim 1 or 2 wherein the shoulder means is an inwardly extending, annular flange means.

5. A die assembly in accordance with claim 4 which additionally includes a disc means adapted to rest against the downstream side of the shoulder means and the downstream mandrel section is removably mounted in said die through said disc means.

6. A die assembly in accordance with claim 5 wherein the downstream mandrel section is removably mounted in said die by at least one bolt means passing through the disc means.

7. A die assembly in accordance with claim 1 or 2 which additionally includes disc means adapted to rest against the downstream side of the downstream mandrel section and the downstream mandrel section is removably mounted in said die through said disc means.

8. A die assembly in accordance with claim 1 or 2 wherein the downstream mandrel section has a length of at least about one-third of the total length of the upstream mandrel section plus said downstream mandrel section.

9. A die assembly in accordance with claim 1 or 2 which additionally includes an elongated, cooled portion comprising at least one elongated sizing ring removably mounted on said die downstream of the heated portion of said die and having an inside diameter differing from the inside diameter of the bushing ring.

10. A die assembly in accordance with claim 9 wherein the at least one sizing ring includes at least two sizing rings of equal length, including a first sizing ring having an inside diameter equal to the inside diameter of the bushing ring and at least one second sizing ring having an inside diameter larger than said inside diameter of said bushing ring and said inside diameters of said sizing rings are fixed values determined by the percent shrinkage of the plastic to be used.

11. A die assembly in accordance with claim 1 or 2 in which each downstream mandrel section is adapted to produce a pipe having a standard dimension ratio defined by the ratio of the outside diameter of said pipe to the minimum wall thickness of said pipe.

12. A die assembly in accordance with claim 11 wherein the land length is approximately:

$$LL = DO \times LL/DO$$

where:
LL = Land Length, inches,
LL/DO = Land Length to Die Opening Ratio and a fixed valve for the plastic to be used, and,
DO = Die Opening, inches, distance between the bushing ring and the downstream mandrel section and is approximately:

$$DO = DR \times t$$

where:
DR = Draw Ratio, preselected to produce a pipe having a specific wall thickness from a die having a specific die opening utilizing a particular plastic, and,
t = Minimum Wall Thickness, inches, for a pipe having a standard dimension ratio intermediate the standard dimension ratios of the pipes having the largest and the smallest miniumum wall thicknesses to be produced by the die.

13. A die in accordance with claim 12 wherein the standard dimension ratio intermediate the standard dimension ratios of the pipes having the largest and the smallest minimum wall thicknesses to be produced by the die is approximately midway between said standard dimension ratios of said pipes having the largest and the smallest minimum wall thicknesses to be produced by said die.

14. A die in accordance with claim 12 wherein each of the die openings between the bushing ring and the downstream mandrel sections other than the downstream mandrel section adapted to produce a pipe having a standard dimension ratio intermediate the standard dimension ratios of the pipes having the largest and the smallest minimum wall thicknesses to be produced by the die are approximately:

$$DO = DR \times t$$

where:
- $t$ = Minimum Wall Thickness, inches, for each of the pipes to be produced by the die having standard dimension ratios other than said intermediate standard dimension ratio.

15. A die in accordance with claim 14 wherein the mandrel outside diameter of each of the downstream mandrel sections is approximately:

$$MOD = BID - 2DO$$

where:
- $MOD$ = Mandrel Outside Diameter, inches, for the downstream mandrel section in question,
- $BID$ = Bushing Inside Diameter, inches, for the bushing ring.

* * * * *